United States Patent Office 3,513,139
Patented May 19, 1970

1

3,513,139
INHIBITING PREMATURE VULCANIZATION
OF RUBBER
Aubert Y. Coran, Creve Coeur, Mo., and Chester D. Trivette, Jr., and Joseph E. Kerwood, St. Albans, W. Va., assignors to Monsanto Company, St. Louis, Mo., a corporation of Delaware
No Drawing. Filed Jan. 6, 1966, Ser. No. 518,987
Int. Cl. C08c 1/00, 11/54; C08f 27/06
U.S. Cl. 260—79.5                                          51 Claims

ABSTRACT OF THE DISCLOSURE

Premature vulcanization of a vulcanizable rubber is inhibited by incorporating therein besides vulcanizing agent and accelerator an amount effective to inhibit premature vulcanization of a compound of the formula

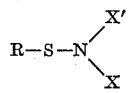

wherein $x$ is cycloalkyl, lower alkyl, alkaryl, aryl, aralkyl, or hydrogen and $x'$ is cycloalkyl, lower alkyl, alkaryl, aryl, or aralkyl, or $x$ and $x'$ together with the nitrogen atom are

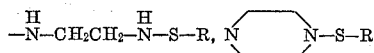

morpholine, or lower alkyl substituted morpholine; and wherein R is aryl, aralkyl, cycloalkyl, alkyl of 1 to 20 carbon atoms, or alkaryl.

This invention relates to an improved vulcanizing process for rubber and to the rubber stocks obtained by using this improved process. The invention relates to improved accelerator-inhibitor combinations for rubber. More particularly, the invention relates to a method for preventing the aging and premature vulcanization of rubber stocks and to the rubber compositions obtained by using this method.

In the manufacture of vulcanized rubber products, crude rubber is combined with various other ingredients such as fillers, accelerators, and antidegradants to alter and improve processing of rubber and to improve the properties of the final product. The crude rubber is put through several steps in the factory before it is ready for the final step of vulcanization. Generally, the rubber is mixed with carbon black and other ingredients except the vulcanizing agent and accelerator. Then the vulcanizing and accelerating agents are added to this masterbatch in a Banbury mixer or on a mill. Scorching, viz., premature vulcanization, can occur at this stage of the processing, during extrusion or other shaping operations, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazole sulfenamides delayed onset of the vulcanizing process, but they have not been entirely satisfactory. Mercaptobenzothiazole is a valuable organic vulcanization accelerator but by present standards would be considered scorchy. It has been largely replaced by the delayed-action accelerators, but further improvement has eluded the art. The development of high pH furnace blacks which lack the inherent inhibiting effect of the acidic channel blacks and the popularity of certain phenylenediamine antidegradants which promote scorching have placed increasingly stringent demands on the accelerator system.

Vulcanization retarders have long been available to rubber compounders. They include N-nitrosodiphenylamine, rosin and salicyclic acid. See Editors, Rubber World Compounding Ingredients for Rubber, 91–94 (3rd edition, 1961). Acids are generally ineffective with thiazolesulfenamide accelerators or adversely affect this vulcanizing process. Nitrosoamines are only of limited effectiveness with thiazole sulfenamides derived from primary amines.

An object of this invention is to provide a method to effectively prevent the premature vulcanization of rubber. A further object of this invention is to provide a method to increase the available processing time prior to the actual vulcanization of rubber. A further object of this invention is to provide an increased cure rate for rubber. A further object of this invention is to provide a method to prevent the premature vulcanization of gum rubber in storage containing a vulcanization and accelerating agent. A further object of this invention is to improve the storage stability of an uncured rubber mixture containing an accelerator. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide new and improved vulcanized rubber products. Other objects of the invention will become apparent as the description proceeds. These objects are accomplished by using the accelerator-inhibitor combinations of this invention.

We have discovered a class of sulfenamides which are outstanding inhibitors of premature vulcanization. The characteristic nucleus is

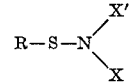

wherein $x$ and $x'$ are identical or dissimilar cycloalkyl, lower alkyl, alkaryl, aryl, or aralkyl radicals, or one may be hydrogen. When $x$ and $x'$ are taken together with the nitrogen atom, they are

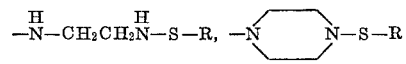

morpholine, or mono-, di-, tri-, or tetra(lower alkyl) morpholine. R is a straight or branched chain alkyl of 1 to 20 carbon atoms but preferably 3 to 8 carbon atoms, alkaryl, aryl, aralkyl, or cycloalkyl. The term cycloalkyl includes cycloalkyl radicals of 5 to 8 carbon atoms. The term lower alkyl includes alkyls of 1 to 8 carbon atoms of straight or branched chains.

Aryl sulfenamides derived from secondary amines have been described as vulcanization-accelerating agents. See U.S. Pat. Re. 19,286, Zaucker assigned to I. G. Farbenindustrie (1934). It has also been reported that certain aryl sulfenamides characterized by the presence of an electronegative group in the aryl nucleus which ordinarily alone have no substantial accelerating power will, nevertheless, retard the action of nitrogen-containing vulcanization accelerators and will increase their strength. See U.S. Pat. Nos. 2,382,813 (1944) and 2,460,393 (1945)

to Paul assigned to United States Rubber Co. More recently, Lober reported that pentachlorophenyl sulfenamides were vulcanization accelerators of the delayed-action type. See U.S. Pat. 3,047,546, Lober assigned to Farbenfabriken Bayer (1962). The aryl sulfenamides employed in the practice of the present invention contain no electronegative group, yet remarkably increase processing safety of vulvanizable stocks. The stocks are fully accelerated in the absence of the inhibitor and may contain an amine to protect the rubber from degradation. The amine usually reduces processing safety, but the new vulcanizing systems are effective to prevent premature vulcanization in the presence thereof. The data infra illustrate that a combination of an accelerator and an inhibitor of this invention is an improved rubber additive which allows significantly longer and safer processing time for rubber than that provided hitherto for the rubber industry. Further, the accelerator-inhibitor combinations of this invention may improve the modulus of a vulcanizate considerably. The storage stability of a rubber mixture containing an accelerator-inhibitor combination of this invention is improved compared to a rubber mixture containing an accelerator alone. Inhibitors of this invention also enhance the antidegradant properties of a vulcanizate.

Examples of the premature-vulcanization inhibitors of this invention are

N-(phenylthio)morpholine,
N-(phenylthio)-2,6-dimethyl morpholine,
N-(phenylthio)dicyclohexylamine,
N-(phenylthio)aniline,
N-(phenylthio)diisopropylamine,
N-(phenylthio)diethylamine,
N-(phenylthio)tert-butylamine, and
N,N'-di(phenylthio)ethylenediamine.

The invention includes inhibitors, for example,

N-(phenylthio)-N-phenyl loweralkyl amine,
N-(phenylthio)cyclohexylamine,
N-(phenylthio)loweralkyl amine,
N-phenylthio-N-tert-butyl ethylamine,
N-phenylthio-N-cyclohexyl methylamine,
N-phenylthio-N-phenyl ethylamine,
N-phenylthio-N-phenyl cyclohexylamine,
N-tolylthio-N-cyclohexyl methylamine,
N-(n-butylthio)morpholine,
N-(benzylthio)morpholine,
1,4-bis(n-butylthio)piperazine,
N-(dodecylthio)morpholine,
1,4-bis(benzylthio)piperazine,
N-(tert-butylthio)morpholine,
N-(n-butylthio)-N-ethyl-n-butylamine,
N-(n-butylthio)-N-methylaniline,
N-(n-octylthio)morpholine,
1,4-bis(decylthio)piperazine,
N-(n-tetradecylthio)morpholine,
1,4-bis(n-hexadecyl)piperazine,
N-(n-octadecylthio)morpholine,
N-(sec-tridecylthio)morpholine,
N-(sec-octylthio)morpholine,
N-(sec-octylthio)morpholine, and
1,4-bis(tert-pentadecylthio)piperazine.

The results obtained depend peculiarly on selection of the sulfenamide inhibitor. Preferably

is morpholino or 2,6-dimethyl morpholino. When $x'$ is H, it is preferred that $x$ be alkyl of 3 to 6 carbon atoms or phenyl. When neither $x$ nor $x'$ is H and each is independent, it is preferred that both $x$ and $x'$ are alkyl of 3 to 6 carbon atoms or that $x$ is phenyl and $x'$ is lower alkyl. Also, when $x$ is phenyl, cyclohexyl is comparable to alkyl of 3 to 6 carbon atoms. R of the general formula is preferably phenyl, tolyl, benzyl, or primary or secondary alkyl of 3 to 12 carbon atoms.

Rubber stocks containing delayed-action accelerators can be used in the process of this invention. Cheaper, more scorchy accelerators can also be used with an excellent degree of improvement. The improved vulcanizing method of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, organic accelerators, and antidegradants. For the purposes of this invention, sulfur-vulcanizing agent means elemental sulfur or sulfur-containing vulcanizing agent, for example, an amine disulfide, or a polymeric polysulfide. The invention is applicable to vulcanization accelerators of various classes. For example, rubber mixes containing the aromatic thiazole accelerators which include N-cyclohexyl benzothiazole - 2 - sulfenamide, 2-mercapto-benzothiazole, N-tert-butyl-benzothiazole-2-sulfenamide, 2 - benzothiazolyl diethyldithiocarbamate, and 2 - (morpholinothio)benzothiazole can be used. Thiazole accelerators other than aromatic can be used. Stocks containing accelerators, for exampe tetlramethylthiuram disulfide, tetramethylthiuram monosulfide, aldehyde amine condensation products, and guanidine derivatives, are substantially improved using the method of our invention. Stocks containing mixtures of accelerators are substantially improved by using the method of our invention. Rubber mixes containing antidegradants, for example N-1,3-dimethylbutyl - N' - phenyl-p-phenylenediamine, N,N'-bis 1,4 - dimethylpentyl) - p - phenylenediamine, N,N' - bis (2-octyl)-p-phenylenediamine, and other phenylenediamines, ketone, ether, and hydroxy antidegradants and mixtures thereof, are substantially improved using the process of our invention.

The inhibitors of our invention can be used in natural and synthetic rubbers. Synthetic rubbers that can be improved by the process of this invention include cis-4-polybutadiene, Butyl rubber, ethylene-propylene terpolymers, polymers of 1,3-butadiene, for example 1,3-butadiene itself and of isoprene and copolymers of 1,3-butadiene with other monomers, for example styrene, acrylonitrile, isobutylene, and methyl methacrylate. The invention relates to diene rubbers, and the terms rubber and diene rubber are synonymous for the purposes of this invention.

The following tables illustrate the invention in greater detail and the best mode for carrying it out, but are not to be construed as to narrow the scope of our invention. For the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney scorch test are desirable because this indicates greater processing safety. Percentage increases in scorch delay are calculated by dividing the Mooney scorch time of the stock containing the premature-vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disc Rheometer described by Decker, Wise, and Guerry in Rubber World, December 1962, p. 68. From the rheometer data, R.M.T. is the maximum modulus torque in rheometer units, $t_3$ or $t_2$ is the time in minutes for a rise of three or two rheometer units, respectively, above the minimum reading and $t_{90}$ is the time required to obtain a modulus 90% of the maximum. The specific rate constant "$k$" is measured in reciprocal minutes. See Coran, 37 Rubber Chemistry and Technology 689 (1964). Higher values of $k_2$ indicate higher rates of cross linking. With the aid of $k_2$, $k_1$ can be calculated and provides another measure of processing safety. Lower values of $k_1$ indicate less scorch.

The trademarks of some compounds used in the practice of this invention are Santocure, Santocure MOR, Santoflex 77, Santocure NS, DPG, and Thiofide. Santocure is the accelerator N-cyclohexyl benzothiazole-2-sulfenamide. Santocure MOR is the accelerator 2-(morpholinothio)benzothiazole. Santocex 77 is the antidegradant N,N' - bis(1,4 - dimethylphenyl) - p - phenylenediamine. Santocure NS is the accelerator N-tert-butylbenzothiazole-2-sulfenamide. DPG is an accelerator reported to be diphenylguaridine. Thiofide is an accelerator reported to be benzothiazyl disulfide.

Table I illustrates the use of N-(phenylthio)morpholine as a premature-vulcanization inhibitor in natural rubber containing Santoflex 77, Santocure NS, and sulfur. The natural rubber A-6 masterbatch is comprised of the following:

| | Parts per hundred rubber |
|---|---|
| Natural rubber smoked sheets | 100 |
| High abrasion furnace carbon black | 50 |
| Zinc oxide | 5 |
| Stearic acid | 3 |
| Hydrocarbon softener | 10 |

TABLE I

| | Stocks | | | |
|---|---|---|---|---|
| | 1 | 2 | 3 | 4 |
| A-6 masterbach | 168 | 168 | 168 | 168 |
| Santoflex 77 | 2 | 2 | 2 | 2 |
| N-(phenylthio)morpholine | | 0.25 | 0.5 | 1.0 |
| Santocure NS | 0.5 | 0.5 | 0.5 | 0.5 |
| Sulfur | 2.5 | 2.5 | 2.5 | 2.5 |
| Mooney Scorch at 121° C.: | | | | |
| $t_5$ | 26.6 | 33.4 | 35.7 | 40.9 |
| Percent increase in scorch delay | | 25 | 34 | 54 |
| Rheometer at 144° C.: | | | | |
| RMT | 56.3 | 58.0 | 58.2 | 58.2 |
| $t_2$ | 8.2 | 9.6 | 10.3 | 11.5 |
| $t_{90}$ | 16.7 | 18.0 | 18.2 | 18.8 |
| $t_{90}-t_2$ | 8.5 | 8.4 | 7.9 | 7.3 |
| $k_1$ | .0148 | .009 | .007 | .005 |
| $k_2$ | .230 | .239 | .255 | .255 |
| Time to optimum cure (min.) | 25 | 25 | 25 | 25 |
| Shore A hardness | 60 | 60 | 60 | 60 |
| 300% modulus, p.s.i | 2,100 | 2,130 | 2,140 | 2,160 |
| Ultimate tensile strength, p.s.i | 3,600 | 3,700 | 3,800 | 3,600 |
| Ultimate elongation, percent | 450 | 480 | 490 | 470 |

The increased cure rate is illustrated in Table I by the figures $t_{90}-t_2$.

Table II illustrates the use of N-(phenylthio)morpholine as a premature-vulcanization inhibitor in an oil-extended styrene-butadiene rubber containing Santoflex 77, Santocure NS, and sulfur. The oil-extending styrene-butadiene B-5 masterbatch is comprised of the following:

| | Parts per hundred rubber |
|---|---|
| Oil-extending styrene-butadiene rubber containing 37.5% highly aromatic oil | 137.5 |
| Intermediate super abrasion furnace carbon black | 68.5 |
| Zinc oxide | 3.0 |
| Stearic acid | 2.0 |

In an oil-extended B-5 masterbatch containing Santocure MOR and no phenylenediamine antidegradant, a 60% increase in scorch delay is noted using the inhibitor N-(phenylthio)morpholine. Using an accelerator combination of Thiofide and DPG with N- phenylthio)mor-

TABLE II

| | Stocks | | | |
|---|---|---|---|---|
| | 1 | 2 | 3 | 4 |
| Oil-extended styrene-butadiene rubber B-5 masterbatch | 211 | 211 | 211 | 211 |
| Santoflex 77 | 2 | 2 | 2 | 2 |
| N-(phenylthio)morpholine | | 0.25 | 0.50 | 1.0 |
| Santocure NS | 1.4 | 1.4 | 1.4 | 1.4 |
| Sulfur | 1.7 | 1.7 | 1.7 | 1.7 |
| Mooney scorch at 135° C.: | | | | |
| $t_5$ | 17.8 | 20.7 | 22.7 | 23.7 |
| Percent increase in scorch delay | | 16 | 27 | 33 |
| Rheometer at 153° C.: | | | | |
| RMT | 52.4 | 51.5 | 50.7 | 49.4 |
| $t_2$ | 8.0 | 10.0 | 10.2 | 11.5 |
| $t_{90}$ | 14.9 | 16.4 | 16.0 | 16.7 |
| $t_{90}-t_2$ | 6.9 | 6.4 | 5.8 | 5.2 |
| $k_1$ | .015 | .004 | .003 | .001 |
| $k_2$ | .230 | .300 | .330 | .364 |
| Time to optimum cure | 35 | 35 | 35 | 35 |
| Shore A hardness | 60 | 60 | 58 | 55 |
| 300% modulus, p.s.i | 1,060 | 1,090 | 1,050 | 1,050 |
| Ultimate tensile strength, p.s.i | 3,300 | 3,400 | 3,400 | 3,400 |
| Ultimate elongation, percent | 620 | 650 | 650 | 660 | pholine and no antidegradant, a 116% increase in scorch delay is noted. These data are illustrated in Table III.

TABLE III

| | Stocks | | | |
|---|---|---|---|---|
| | 1 | 2 | 3 | 4 |
| Oil-extended styrene-butadiene rubber masterbach | 211 | 211 | 211 | 211 |
| Sulfur | 2.0 | 2.0 | 2.0 | 2.0 |
| Santocure MOR | 1.2 | 1.2 | | |
| Thiofide | | | 1.0 | 1.0 |
| DPG | | | 0.7 | 0.7 |
| N-(phenylthio)morpholine | | 1.0 | | 1.0 |
| Mooney scorch at 135° C.: | | | | |
| $t_5$ | 26.8 | 43.0 | 10.9 | 23.6 |
| Percent increase in scorch delay | | 60 | | 116 |

N-(phenylthio)morpholine increases the cure rate in natural rubber and synthetic rubber stocks. Further, in oil-extended styrene-butadiene rubber, N-(phenylthio)morpholine gives a marked improvement in the cross-linking rate. These properties are highly desirable in the manufacture of rubber.

N-(phenylthio)morpholine is an active antidegradant when used alone or with a phenylenediamine antidegradant as demonstrated by Table IV. The intermittent ozone data show a 32-hour increase over the control in the 70% retention of a rubber stock containing the combination Santocure MOR and N-(phenylthio)morpholine of this invention. The known antidegradant, N-1,3,-dimethylbutyl-N'-phenyl-p-phenylenediamine, shows a 40-hour increase over the control and the accelerator-inhibitor combination with N-1,3-dimethylbutyl-N'-phenyl-p-phenylenediamine shows a 64-hour increase. The method used for measuring the ozone damage to vulcanized rubber is described by Decker and Wise, The Stress Relaxation Mthod for Measuring Ozone Cracking, Rubber World, April 1962, p. 66. The intermittent test comprises two-hour cycles during which rubber specimens are exposed dynamically 15% of the time, and during the remaining time of the cycle are exposed statically at 25% strain.

TABLE IV

| | Stocks | | | |
|---|---|---|---|---|
| | 1 | 2 | 3 | 4 |
| A-6 masterbach | 168 | 168 | 168 | 168 |
| Sulfur | 2.5 | 2.5 | 2.5 | 2.5 |
| Santocure MOR | 0.5 | 0.5 | 0.5 | 0.5 |
| N-1,3-dimethylbutyl-N'-p-phenylenediamine | | | 2.0 | 2.0 |
| N-(phenylthio)morpholine | | 1.0 | | 1.0 |
| Mooney scorch at 121° C. $t_5$ | 44.9 | 70.8 | 44.0 | 64.0 |
| Intermittent ozone: Hours to 70% retention | 32 | 64 | 72 | 96 |
| Dynamic ozone: Hours to 80% retention | 12 | 29 | 51 | 66 |

Comparable results are obtained using the other compounds of this invention in degradation tests.

rubber. N-(phenylthio)morpholine is included in Table VI. The rubber mixture of the test is an A-6 masterbatch.

TABLE VI

|  | Stocks | | | | | | |
|---|---|---|---|---|---|---|---|
|  | 1 | 2 | 3 | 4 | 5 | 6 | 7 |
| A-6 masterbatch | 168 | 168 | 168 | 168 | 168 | 168 | 168 |
| Sulfur | 2.5 | 2.5 | 2.5 | 2.5 | 2.5 | 2.5 | 2.5 |
| Santocure MOR | 0.5 | 0.5 | 0.5 | 0.5 | 0.5 | 0.5 | 0.5 |
| N-(phenylthio)dicyclohexylamine |  | 1.0 |  |  |  |  |  |
| N-(phenylthio)diisopropylamine |  |  | 1.0 |  |  |  |  |
| N-(phenylthio)-2,6-dimethylmorpholine |  |  |  | 1.0 |  |  |  |
| N-(phenylthio)-tertbutylamine |  |  |  |  | 1.0 |  |  |
| N-(phenylthio)-morpholine |  |  |  |  |  | 1.0 |  |
| N,N'-di(phenylthio)-ethylenediamine |  |  |  |  |  |  | 1.0 |
| Mooney scorch at 121° C.: |  |  |  |  |  |  |  |
| $t^5$ | 32.7 | 44.4 | 49.6 | 58.3 | 62.8 | 62.1 | 55.3 |
| Percent increase in scorch delay |  | 36 | 51 | 78 | 92 | 90 | 69 |
| Rheometer at 144° C.: |  |  |  |  |  |  |  |
| $k^1$ | .031 | .0087 | .0065 | .0058 | .0060 | .0036 | .007 |
| $k^2$ | .137 | .168 | .188 | .197 | .168 | .208 | .162 |
| $t^3$ | 7.5 | 12.0 | 12.6 | 12.9 | 15.2 | 15.4 | 13.7 |
| RMT | 63 | 72 | 73 | 72 | 70 | 72 | 64 |

Table V illustrates the stabilizing properties of N-(phenylthio)morpholine on rubber mixtures containing accelerated sulfur-curing systems. The Mooney scorch data in Table V indicates the loss of effectiveness of Santocure MOR, Santocure, and Santocure NS in storage. The addition of N-(phenylthio)morpholine eliminates this loss of effectiveness, and in the aged green natural rubber Stock 4 the Mooney scorch is improved in a mixture containing an accelerator-inhibitor combination. The percentage loss of effectiveness under $k_2$ further illustrates this unexpected improvement.

TABLE V

|  | Stocks | | | |
|---|---|---|---|---|
|  | 1 | 2 | 3 | 4 |
| A-6 | 168 | 168 | 168 | 168 |
| Sulfur | 2.5 | 2.5 | 2.5 | 2.5 |
| Santocure MOR | 0.5 | 0.5 |  |  |
| Santocure |  |  | 0.5 | 0.5 |
| N-(phenylthio)morpholine |  | 1.0 |  | 1.0 |
| Mooney scorch at 121° C.: |  |  |  |  |
| $t^5$ (Initial) | 39.3 | 73.3 | 31.4 | 70.4 |
| $t^5$ (Aged 2 days—70° C.) | 26.2 | 70.4 | 8.3 | 48.8 |
| Percent retention of scorch delay | 67.0 | 96.0 | 26.0 | 69.0 |
| Rheometer at 144° C. $k^2$ (min.$^{-1}$): |  |  |  |  |
| Initial | .148 | .206 | .148 | .175 |
| Aged 2 days at 70° C | .123 | .206 | .112 | .182 |
| Change in effectiveness after 2 days, percent | ¹17 | 0 | ¹24 | ²4 |

|  | 1 | 2 | 3 | 4 | 5 | 6 |
|---|---|---|---|---|---|---|
| B-5 masterbatch | 211 | 211 | 211 | 211 | 211 | 211 |
| Sulfur | 2.0 | 2.0 | 2.0 | 2.0 | 2.0 | 2.0 |
| Santocure | 1.0 | 1.0 |  |  |  |  |
| Santocure NS |  |  | 1.0 | 1.0 |  |  |
| Santocure |  |  |  |  | 1.0 | 1.0 |
| N-(phenylthio)morpholine |  | 1.0 |  | 1.0 |  | 1.0 |
| Mooney scorch at 135° C.: |  |  |  |  |  |  |
| $t^5$ (Initial) | 35.7 | 48.2 | 25.5 | 45.8 | 23.5 | 41.1 |
| $t^5$ (Aged 4 days at 70° C.) | 22.5 | 43.4 | 13.7 | 40.3 | 11.7 | 35.0 |
| Percent retention of scorch delay | 63.0 | 90.0 | 53.0 | 88.0 | 50.0 | 85.0 |
| Rheometer at 153° C. $k^2$ (min.$^{-1}$): |  |  |  |  |  |  |
| Initial | .115 | .214 | .112 | .236 | .105 | .205 |
| Aged 4 days—70° C | .104 | .214 | .090 | .214 | .080 | .206 |
| Loss in effectiveness after 4 days, percent | 10 | 0 | 20 | 10 | 24 | 0 |

¹ Loss.
² Improvements.

Comparable results are obtained using the other compounds of this invention as stabilizers of rubber mixtures containing accelerated sulfur-curing systems.

Table VI illustrates the use of some inhibitors of this invention with the accelerator Santocure MOR in natural One part N-(phenylthio)aniline shows a 72% increase in scorch delay according to the Mooney scorch data from a natural rubber A-6 masterbatch also containing 3 parts Santoflex 77, 0.5 part Santocure MOR, and 2.5 parts sulfur. One part N-phenylthio-N-phenyl ethylamine shows a 108% increase in scorch delay, and one part N-phenylthio-N-phenyl cyclohexylamine shows a 77% increase in an A-6 masterbatch containing 2.5 parts sulfur and 0.50 part Santocure MOR.

Table VII illustrates the use of 1,4-bis(phenylthio) piperazine as a premature-vulcanization inhibitor in a natural rubber masterbatch containing the following:

Parts per hundred rubber
Natural rubber smoked sheets _____ 100
Intermediate super-abrasion furnace carbon black __ 60
Zinc oxide _____ 5.0
Stearic acid _____ 2.5
Hydrocarbon softener _____ 20

TABLE VII

|  | Stocks | | | |
|---|---|---|---|---|
|  | 1 | 2 | 3 | 4 |
| Masterbatch | 187.5 | 187.5 | 187.5 | 187.5 |
| Sulfur | 2.5 | 2.5 | 2.5 | 2.5 |
| Santocure | 0.5 | 0.5 | 0.5 | 0.5 |
| N-1,3-dimethylbutyl-N'-phenyl-p-phenylenediamine |  |  | 3.0 | 3.0 |
| 1,4-bis(phenylthio)piperazine |  | 0.5 |  | 0.5 |
| Mooney scorch at 121° C.: |  |  |  |  |
| $t_5$ | 50.1 | 72.0 | 37.6 | 53.7 |
| Percent increase in scorch delay |  | 44 |  | 43 |
| Rheometer at 144° C.: |  |  |  |  |
| RMT | 46 | 61 | 50 | 61 |
| $t_3$ | 12.8 | 16.4 | 10.7 | 13.7 |
| $k_1$ | .012 | .0044 | .015 | .0062 |
| $k_2$ | .132 | .164 | .157 | .175 |

Tables VIII and IX further illustrate the outstanding premature-vulcanization inhibitor properties of the compounds of this invention.

TABLE VIII

|  | Stocks | | | |
|---|---|---|---|---|
|  | 1 | 2 | 3 | 4 |
| A-6 masterbatch | 168 | 168 | 168 | 168 |
| Sulfur | 2.5 | 2.5 | 2.5 | 2.5 |
| N-1,3-dimethylbutyl-N'-phenyl-p-phenylenediamine | 2.0 | 2.0 | 2.0 | 2.0 |
| Santocure MOR | 0.5 | 0.5 | 0.5 | 0.5 |
| N-(n-butylthio)morpholine |  | 1.0 |  |  |
| N-(benzylthio)morpholine |  |  | 1.0 |  |
| 1,4-bis(n-butylthio)piperazine |  |  |  | 1.0 |
| Mooney scorch at 135° C.: |  |  |  |  |
| $t_5$ | 12.9 | 24.1 | 26.6 | 23.8 |
| Percent increase in scorch delay |  | 87 | 106 | 85 |
| Rheometer at 144° C.: |  |  |  |  |
| RMT | 55.0 | 65.5 | 67.0 | 64.0 |
| $t_2$ | 9.8 | 17.8 | 19.0 | 17.7 |
| $t_{90}$ | 27.0 | 30.7 | 32.0 | 32.8 |
| $k_2$ | .138 | .173 | .173 | .145 |
| $t_{90}-t_2$ | 17.2 | 12.9 | 13.0 | 15.1 |

TABLE IX

| | Stocks | | |
|---|---|---|---|
| | 1 | 2 | 3 |
| A-6 masterbatch | 168 | 168 | 168 |
| Sulfur | 2.5 | 2.5 | 2.5 |
| N-1,3-dimethylbutyl-N'-phenyl-p-phenylenediamine | 2.0 | 2.0 | 2.0 |
| Santocure MOR | 0.5 | 0.5 | 0.5 |
| N-(n-dodecylthio)morpholine | | 1.0 | |
| 1,4-bis(benzylthio)piperazine | | | 1.0 |
| Mooney scorch at 121° C.: | | | |
| $t_5$ | 44.5 | 74.8 | 69.5 |
| Percent increase in scorch delay | | 70 | 57 |
| Rheometer at 144° C.: | | | |
| RMT | 54.0 | 57.2 | 64.1 |
| $t_2$ | 9.8 | 18.0 | 18.7 |
| $k_2$ | .145 | .345 | .134 |

Results comparable to those shown in the tables supra are obtained when the remaining compounds of this invention are tested as premature-vulcanization inhibitors.

Table X illustrates the improvement of the inhibitors of this invention over the compounds of the Lober U.S. Pat. No. 3,047,546, supra. N-(phenylthio)morpholine shows a 45% increase in scorch delay by rheometer $t_2$ over the control while Lober's N-(pentachlorophenylthio)morpholine shows a mere 4% increase under the same conditions. Thus, N-(phenylthio)morpholine shows more than a tenfold percentage improvement as premature-vulcanization inhibitor over the Lober compounds. The results in Table X are obtained in an A–6 natural rubber masterbatch containing 2.0 parts N-1,3-dimethylbutyl-N-phenyl-p-phenylenediamine, 0.5 part Santocure MOR, and 2.5 parts sulfur.

TABLE X

| | Stocks | | |
|---|---|---|---|
| | 1 | 2 | 3 |
| Masterbatch | 168 | 168 | 168 |
| N-(pentachlorophenylthio)morpholine | | 0.5 | |
| N-(phenylthio)morpholine | | | 0.5 |
| Mooney scorch at 121° C., $t_5$ | 42.7 | 44.6 | 57.1 |
| Rheometer at 144° C.: | | | |
| RMT | 55.6 | 64.3 | 65.4 |
| $t_2$ (min.) | 10.0 | 10.4 | 14.5 |
| Percent increase in scorch delay | | 4 | 45 |
| $t_{90}$ (min.) | 27.0 | 26.8 | 29.5 |
| $k_2$ | .136 | .138 | .173 |
| $t_{90}-t_2$ | 17.0 | 16.4 | 15.0 |

Table XI illustrates the improvement using the inhibitors of this invention over N-(p-nitrophenylthio)-tert-butylamine of the Paul U.S. Pat. 2,460,393, supra. N-(phenylthio)-morpholine is included in the table for comparison purposes. N-(phenylthio)-tert-butylamine shows a seventeenfold improvement in scorch delay over the compound N-(p-nitrophenylthio)-tert-butylamine. The increase in scorch delay over the control using N-(p-nitrophenylthio)-tert-butylamine is a mere 3% while the increase with N-(phenylthio)-tert-butylamine of this invention is 51%. An electronegative group is actually detrimental in an attempt to increase processing time. The test results in Table XI are obtained in an A–6 natural rubber masterbatch containing 2.0 parts N-1,3-dimethylbutyl-N'-phenyl-p-phenylenediamine, 0.5 part Santocure MOR, and 2.5 parts sulfur.

TABLE XI

| | Stocks | | | |
|---|---|---|---|---|
| | 1 | 2 | 3 | 4 |
| N-(phenylthio)-tert-butylamine | | 1.0 | | |
| N-(p-nitrophenylthio)-tert-butylamine | | | 1.0 | |
| N (phenylthio)morpholine | | | | 1.0 |
| Mooney scorch at 121° C.: | | | | |
| $t_5$ | 40.5 | 61.2 | 41.7 | 60.3 |
| Percent increase in scorch delay | | 50.5 | 3.0 | 49.0 |
| 300% Modulus, p.s.i | 1,760 | 1,970 | 2,350 | 2,160 |
| Ultimate Tensile Strength, p.s.i | 3,400 | 3,500 | 3,600 | 3,600 |
| Ultimate Elongation, percent | 500 | 450 | 440 | 470 |
| Rheometer at 144° C.: | | | | |
| RMT | 60.8 | 70.0 | 75.2 | 68.0 |
| $t_2$ | 10.2 | 16.0 | 10.8 | 16.3 |
| $k_2$ | .124 | .165 | .165 | .192 |
| $t_{90}$ | 28.4 | 31.0 | 27.0 | 28.5 |

Mixtures of N-(phenylthio)morpholine and mercaptobenzothiazole exert a synergistic effect on cure rate. With mixtures of 0.25 to 0.50 part of N-(phenylthio)morpholine and 0.75 to 50 parts of mercaptobenzothiazole, the rate of cure with 1.0 part of the mixture was greater than with 1.0 part of either ingredient alone.

Accelerator-inhibitor combinations provide valuable composition for controlling the acceleration of vulcanization. Usually the inhibitor will comprise 5% to 95% of the composition by weight, and an organic vulcanization-accelerating agent will comprise 95% to 5% by weight of the composition. Although thiazosulfenamide accelerators are relatively unstable accelerators as compared to most other thiazole accelerators, they can be admixed with the premature-vulcanization inhibitors of this invention without impairing storage stability. In general, the premature-vulcanization inhibitor will comprise .025% to 5% of the rubber whether added neat or as a component of a mixture.

It is intended to cover all changes and modifications of the examples of the invention herein chosen for purposes of disclosure which do not constitute departures from the spirit and scope of the invention.

What is claimed is:

1. The method of inhibiting premature vulcanization of a vulcanizable rubber containing a sulfur-vulcanizing agent and an organic vulcanization-accelerating agent selected from the group consisting of thiazole accelerators, thiuram sulfide accelerators, aldehyde-amine accelerators, and guanidine accelerators which comprises:

incorporating therein in an amount effective to inhibit premature vulcanization a compound of the formula

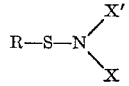

wherein x is cycloalkyl, lower alkyl, alkaryl, aryl, aralkyl, or hydrogen and x' is cycloalkyl, lower alkyl, alkaryl, aryl, or aralkyl or x and x' together with the nitrogen atom are

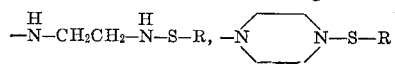

morpholine, or lower alkyl substituted morpholine; and wherein R is aryl, aralkyl, cycloalkyl, alkyl of 1 to 20 carbon atoms, or alkaryl.

2. Rubber vulcanizable compositions obtained by the method of claim 1 wherein the rubber is styrene-butadiene copolymer rubber.

3. An unvulcanized rubber composition, vulcanizable by heating, obtained by the process of claim 1.

4. The method of inhibiting premature vulcanization of a vulcanizable rubber containing elemental sulfur, a thiazole sulfenamide vulcanization-accelerating agent selected from the group consisting of N-cyclohexyl-benzothiazole-2-sulfenamide, N-tert-butyl benzothiazol-2-sulfenamide, N,N - diisopropyl-benzothiazole-2-sulfenamide, N,N - diethyl - benzothiazole-2-sulfenamide, N,N-dicyclohexyl - benzothiazole-2-sulfenamide, 2-(2,6-dimethylmorpholinothio)benzothiazole, and 2-(morpholinothio)benzothiazole which comprises:

incorporating therein in an amount effective to inhibit premature vulcanization a compound of the formula

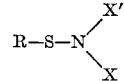

wherein x is cycloalkyl, lower alkyl, alkaryl, aryl, aralkyl, or hydrogen and x' is cycloalkyl, lower alkyl, alkaryl, aryl, or aralkyl;

or x and x' together with the nitrogen atom are

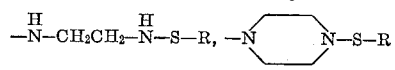

morpholine, or lower alkyl substituted morpholine; and wherein R is aryl, aralkyl, cycloalkyl, alkyl of 1 to 20 carbon atoms, or alkaryl.

5. Rubber vulcanizable compositions obtained by the method of claim 4 wherein the rubber is styrene-butadiene copolymer rubber.

6. An unvulcanized rubber composition, vulcanizable by heating, obtained by the process of claim 4.

7. The method of claim 4 wherein the premature-vulcanization inhibitor is N-(phenylthio)morpholine.

8. Rubber vulcanizable compositions obtained by the method of claim 7 wherein the rubber is styrene-butadiene copolymer rubber.

9. An unvulcanized rubber composition, vulcanizable by heating, obtained by the process of claim 7.

10. The method of claim 4 wherein the premature-vulcanization inhibitor is N-(phenylthio)-2,6-dimethylmorpholine.

11. Rubber vulcanizable compositions obtained by the method of claim 10 wherein the rubber is styrene-butadiene copolymer rubber.

12. An unvulcanized rubber composition, vulcanizable by heating, obtained by the process of claim 10.

13. The method of claim 4 wherein the premature-vulcanization inhibitor is N-(phenylthio)diisopropylamine.

14. Rubber vulcanizable compositions obtained by the method of claim 13 wherein the rubber is styrene-butadiene copolymer rubber.

15. An unvulcanized rubber composition, vulcanizable by heating, obtained by the process of claim 13.

16. The method of claim 4 wherein the premature-vulcanization inhibitor is N-(phenylthio)-tert-butylamine.

17. Rubber vulcanizable compositions obtained by the method of claim 16 wherein the rubber is styrene-butadiene copolymer rubber.

18. An unvulcanized rubber composition, vulcanizable by heating, obtained by the process of claim 16.

19. The method of claim 4 wherein the premature-vulcanization inhibitor is N,N'-di(phenylthio)ethylenediamine.

20. Rubber vulcanizable compositions obtained by the method of claim 19 wherein the rubber is styrene-butadiene copolymer rubber.

21. An unvulcanized rubber composition, vulcanizable by heating, obtained by the process of claim 19.

22. The method of claim 4 wherein the premature-vulcanization inhibitor is 1,4-bis(phenylthio)piperazine.

23. Rubber vulcanizable compositions obtained by the method of claim 22 wherein the rubber is styrene-butadiene copolymer rubber.

24. An unvulcanized rubber composition, vulcanizable by heating, obtained by the process of claim 22.

25. The method of claim 4 wherein the vulcanization-accelerating agent is 2-(morpholinothio)benzothiazole.

26. The method of claim 4 wherein the vulcanization-accelerating agent is N-tert-butyl benzothiazole-2-sulfenamide.

27. The method of inhibiting premature-vulcanization of a vulcanizable rubber containing elemental sulfur, a thiazole sulfenamide vulcanization-accelerating agent selected from the group consisting of N-cyclohexylbenzothiazole-2-sulfenamide, N-tert-butyl benzothiazole-2-sulfenamide, N,N-diisopropyl-benzothiazole-2-sulfenamide, N,N-diethylbenzothiazole-2-sulfenamide, N,N-dicyclohexylbenzothiazole-2-sulfenamide, 2-(2,6-dimethyl morpholinothio)benzothiazole, and 2-morpholinothio)benzothiazole, and an amine antidegradant which comprises: incorporating therein in an amount effective to inhibit premature vulcanization a compound of the formula

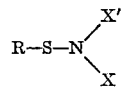

wherein x is cycloalkyl, lower alkyl, alkaryl, aryl, aralkyl, or hydrogen and x' is cycloalkyl, lower alkyl, alkaryl, aryl, or aralkyl; or x and x' together with the nitrogen atom are

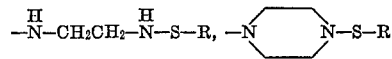

morpholine, or lower alkyl substituted morpholine; and wherein R is aryl, aralkyl, cycloalkyl, alkyl of 1 to 20 carbon atoms, or alkaryl.

28. Rubber vulcanizable compositions obtained by the method of claim 27 wherein the rubber is styrene-butadiene copolymer rubber.

29. An unvulcanized rubber composition, vulcanizable by heating, obtained by the process of claim 27.

30. The method of claim 27 wherein the antidegradant is N-1,3-dimethylbutyl-N'-phenyl-p-phenylenediamine.

31. An accelerator-inhibitor combination comprised of an organic vulcanization-accelerating agent selected from the class consisting of thiazole accelerators, dithiocarbamate accelerators, thiuram sulfide accelerators, aldehyde-amine accelerators, diaryl guanidine accelerators, and mixtures thereof and a premature-vulcanization inhibitor in an amount effective to inhibit premature vulcanization in rubber of the formula

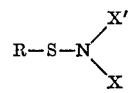

wherein x is cycloalkyl, lower alkyl, alkaryl, aryl, aralkyl, or hydrogen and x' is cycloalkyl, lower alkyl, alkaryl, aryl, or aralkyl; or x and x' together with the nitrogen atom are

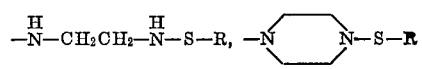

morpholine, or lower alkyl substituted morpholine; and wherein R is aryl, aralkyl, cycloalkyl, alkyl of 1 to 20 carbon atoms, or alkaryl.

32. An accelerator-inhibitor combination according to claim 31 wherein the organic vulcanization-accelerating agent is a thiazole sulfenamide.

33. An accelerator-inhibitor combinatin according to claim 31 wherein the organic vulcanization-accelerating agent is mercaptobenzothiazole.

34. An accelerator-inhibitor combination according to claim 31 wherein the organic vulcanization-accelerating agent is benzothiazyl disulfide.

35. An accelerator-inhibitor combination according to claim 31 wherein the premature-vulcanization inhibitor is N-(phenylthio)morpholine.

36. An accelerator-inhibitor combination according to claim 32 wherein the premature-vulcanization inhibitor is N-(phenylthio)morpholine.

37. The method of claim 1 wherein the vulcanization-accelerating agent is mercaptobenzothiazole.

38. The method of claim 1 wherein the vulcanization-accelerating agent is benzothiazyl disulfide.

39. The method of claim 1 wherein the vulcanization-accelerating agent is alkylthio morpholine where the alkyl is primary or secondary alkyl of 4 to 12 carbon atoms.

40. The method of claim 1 wherein the vulcanization-accelerating agent is a thiazole accelerator and the inhibitor is benzylthio morpholine.

41. The method of claim 1 wherein R is benzyl, cycloalkyl of 5 to 8 carbon atoms, or primary or secondary alkyl of 3 to 12 carbon atoms.

42. The method of claim 1 wherein R is cycloalkyl of 5 to 8 carbon atoms.

43. The method of claim 4 wherein R is benzyl, cycloalkyl of 5 to 12 carbon atoms or primary or secondary alkyl of 3 to 12 carbon atoms.

44. The method of claim 4 wherein R is cycloalkyl of 5 to 8 carbon atoms.

45. The method of claim 27 wherein R is benzyl, cycloalkyl of 5 to 8 carbon atoms or primary or secondary alkyl of 3 to 12 carbon atoms.

46. The method of claim 27 wherein R is cycloalkyl of 5 to 8 carbon atoms.

47. The accelerator-inhibitor combination of claim 31 wherein R is benzyl, cycloalkyl of 5 to 8 carbon atoms or primary or secondary alkyl of 3 to 12 carbon atoms.

48. The accelerator-inhibitor combination of claim 31 wherein R is cycloalkyl of 5 to 8 carbon atoms.

49. The method of claim 1 wherein the rubber contains furnace carbon black.

50. The method of claim 4 wherein the rubber contains furnace carbon black.

51. The method of claim 27 wherein the rubber contains furnace carbon black.

References Cited

UNITED STATES PATENTS

| | | | |
|---|---|---|---|
| 2,382,813 | 8/1945 | Paul | 260—795 |
| 2,423,007 | 6/1947 | Coleman | 260—795 |
| 3,047,546 | 7/1962 | Lober et al. | 260—79.5 |
| 3,312,672 | 4/1967 | Ayad. | |
| 3,356,657 | 12/1967 | Walker | 260—79.5 |

JOSEPH L. SCHOFER, Primary Examiner

C. A. HENDERSON, JR., Assistant Examiner

U.S. Cl. X.R.

260—41.5, 780, 791, 792, 793, 795, 796, 797, 798